(12) United States Patent
Webb et al.

(10) Patent No.: US 6,333,808 B1
(45) Date of Patent: Dec. 25, 2001

(54) OPTICAL SIGNAL SCRAMBLING

(75) Inventors: Stephen Michael Webb, Kent (GB); Ian Haxell, Boca Raton, FL (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/559,656

(22) Filed: Apr. 28, 2000

(51) Int. Cl.$^7$ .................................................. G02F 1/00
(52) U.S. Cl. ......................... 359/321; 359/313; 372/26; 372/27
(58) Field of Search .................... 359/181, 192, 359/238, 239, 246, 326, 484, 321; 372/26, 27; 385/1, 11, 14, 16, 24

(56) References Cited

U.S. PATENT DOCUMENTS

| | | |
|---|---|---|
| 5,159,481 * | 10/1992 | Maeda ................................. 359/189 |
| 5,327,511 | 7/1994 | Heismann et al. ...................... 385/1 |
| 5,361,270 | 11/1994 | Heismann ............................. 372/27 |
| 5,515,199 | 5/1996 | Farina ................................. 369/326 |
| 5,657,151 * | 8/1997 | Swan et al. ........................... 359/281 |
| 6,008,922 * | 12/1999 | Gautheron et al. .................. 359/156 |

* cited by examiner

Primary Examiner—Georgia Epps
Assistant Examiner—John J. Mager
(74) Attorney, Agent, or Firm—Sughrue Mion, PLLC

(57) ABSTRACT

An optical signal scrambler (18) has an optical phase modulator (22) which has a common input/output for an optical signal. The modulator also has an input for a modulating signal and a common output/input which is coupled to a 45° Faraday mirror (24). The scrambler (18) operates to modify an optical input signal received at the input/output of the modulator (22) so that it is returned as an output which is phase scrambled.

11 Claims, 4 Drawing Sheets

OPTICAL SIGNAL SCRAMBLING

FIELD OF THE INVENTION

This invention relates to optical signal scrambling of optical communication signals for improving transmission capabilities over optical fibre.

BACKGROUND TO THE INVENTION

It is well known that in long distance optical communication systems degradation of the signal results from a range of different factors and variations of such factors result in signal fading. This results in reduction of signal to noise ratio and, in digital systems, an increase in the average bit error rate of detection at a receiving station. This phenomena and some methods of reduction of such problems is detailed in U.S. Pat. No. 5,361,270 the whole content of which is included herein by reference.

The invention disclosed in U.S. Pat. No. 5,361,270 employs two concatenated lithium niobate phase modulators with a 45° phase shifting coupling therebetween, each phase modulator being modulated by a different wavelength signal. There is a problem with the concatenation of two phase modulators that requires two different drive frequencies to overcome modulator overlap. Such phase modulators are extremely expensive and the present invention seeks to simplify the design of a scrambler thereby to significantly reduce costs of manufacture.

SUMMARY OF THE INVENTION

According to one aspect of the invention there is provided an optical signal scrambler comprising an optical phase modulator having a common input/output for an optical signal an input for a modulating signal and a common output/input coupled to a 45° Faraday mirror whereby an optical signal input to the input/output of the modulator is returned as an output which is phase scrambled.

The scrambler may comprise coupling means for routing the optical signal to the input/output of the modulator and for coupling the returned signal to an optical transmission line. The coupling means may comprise a three port circulator having a first port for receiving the optical signal a second port coupled to the common input/output of the modulator and a third port for connection the optical transmission line. Alternatively the coupling means may comprise a 3 dB coupler.

The scrambler may comprise a modulating signal generator coupled to the modulating input. Two modulating signal generators of different frequencies may be coupled to the modulating input. In one advantageous arrangement the modulator is arranged to be a travelling wave configuration with a modulating electrode having an input at each end, each of which ends is coupled to a different one of the modulating signal generators thereby to modulate the signal each in a different direction of passage through the modulator. The modulator may be a lithium niobate phase modulator.

The invention also includes an optical signal generator having a scrambler, as previously defined, coupled to a laser signal generator source. A further refinement is the provision of an optical signal generator having a scrambler as previously defined and a plurality of laser signal generators each of a different wavelength coupled via a multiplexer to the scrambler.

The invention also includes a method of phase scrambling of an optical signal including the steps of passing the signal in one direction through an optical phase modulator, modulating the phase of the signal during passage through the modulator to a Faraday reflector, reflecting the modulated signal back through the modulator for further phase modulation thereby to scramble the signal irrespective of its original polarisation.

BRIEF DESCRIPTION OF THE DRAWINGS

In order that the invention and its various other preferred features may be understood more easily, some embodiments thereof will now be described, by way of example only, with reference to the drawings, in which.

The same reference numbers have been used for similar devices in each of the illustrated embodiments.

DETAILED DESCRIPTION

Figure 1:
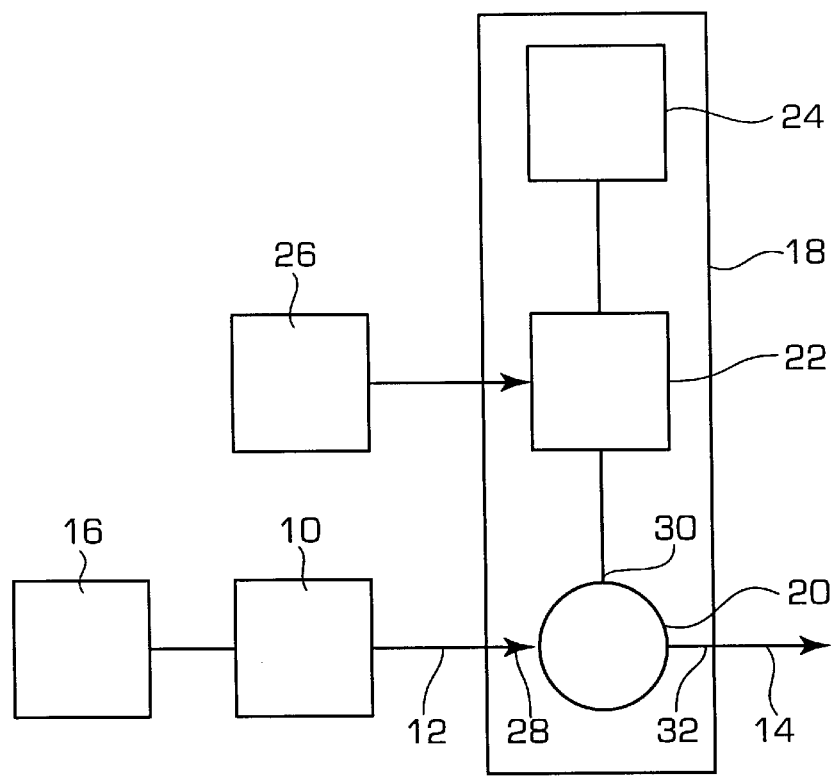
FIG. 1 is a schematic block diagram showing an optical signal generator including an optical signal scrambler constructed in accordance with the invention.

Referring now to FIG. 1 a laser 10 provides a polarised carrier signal for transmission over optical fibres 12, 14. The laser is modulated by a transmission signal generator 16 with an information signal normally of digital form. In order to improve the suitability of the signal for transmission over long distances via fibre 14 the signal is fed via a scrambler 18 which transforms the random orientation polarisation of the light input from fibre 12 to a varying polarisation or non polarised signal for transmission over the fibre 14.

The scrambler 18 comprises a three port optical circulator 20 an optical phase modulator 22, for example a lithiun niobate phase modulator, and a 45° Faraday mirror 24. The optical modulator has an input coupled to an RF driver 26 which in the case of digital transmission has a frequency which preferably is greater than the data rate. In operation a signal for transmission is coupled from the laser 10 over the fibre 12 to a first port 28 of the circulator 20 and exits via the second port 30 to the optical phase modulator 22. The RF driver 26 applies phase modulation to one component of the signal and the signal as modified passes to the Faraday Mirror 24 where the polarisation orientation is rotated by 45° and then reflected for a second pass through the modulator 22. During the second pass, phase modulation is applied to one component of the optical signal. The phase modulator on its own will only act as a polarisation modulator if the input state of the signal is at 45° to its axis. This double pass technique means that on the first pass, if the signal polarisation is at 0 or 90 degrees to the axis of the modulator no change occurs in the polarisation. However, on the return path through the modulator after reflection the polarisation will be at 45° to the axis of the modulator and polarisation modulation will occur. If the input signal to the modulator is at 45° to the axis of the modulator then polarisation will occur on the first pass through the modulator and not on the second pass after reflection. All other input states to the modulator between 0 and 90° should have a modulation contribution from both passes by symmetry. In this way the signal after the second pass through the optical modulator has a varying polarisation state and enters the circulator 20 through the second port 30 and exits through the third port 32 to the fibre 14.

Figure 2:
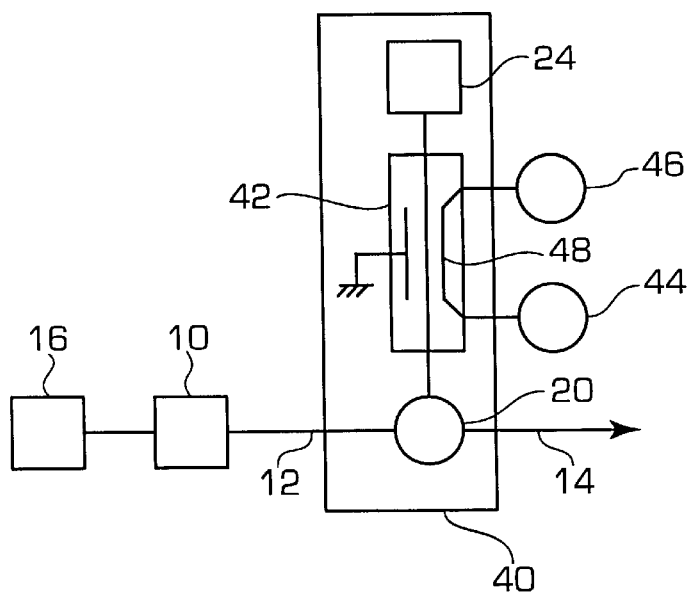
FIG. 2 is a schematic block diagram showing an optical signal generator optical signal scrambler constructed in accordance with the invention and employing two modulating drivers.

FIG. 2 illustrates an optical signal generator similar to that of FIG. 1 but the scrambler 40 employs phase modulator 42 designed to be driven by two different modulating frequencies:—Identical components are given the same reference numerals and will not be further described. In this embodiment the phase modulator, preferably a lithium niobate modulator, is designed as a travelling wave structure. There are two modulators 44 and 46 each coupled to a different end of electrode 48. The modulating signal is required to co-propagate with the optical signal for optimum effect. A counter-propagating optical signal will undergo some disturbance but this depends on the particular device characteristic and the type of modulating signal. To guarantee zero DOP degree of polarisation the difference frequency between modulator 44 and 46 should be equal to the integrated bit periods of the data signals to be transmitted e.g. if the modulator frequencies f1=5 GHz and f2=8 GHz then the best frequency is 3 GHz. Data signals up to 3 GHz would effectively be launched with zero DOP. High data rates would not achieve zero DOP.

Employing the travelling wave aspect of the phase modulator the two modulating signals effect the signal each in a different direction of passage through the modulator. This capability effected by connection of the modulators to opposite ends of the electrode 48 has been proven by experiment as follows:

A standard Mach-Zender Lithium Niobate modulator was supplied with a signal from the output from a wideband electrical network analyser (signal amplitude adjusted to be small so that modulator is running in the linear regime). A suitable laser source was applied to firstly co-propagate down the structure and be detected by a wideband Pin diode for injection to the network analyser.

Figure 3:
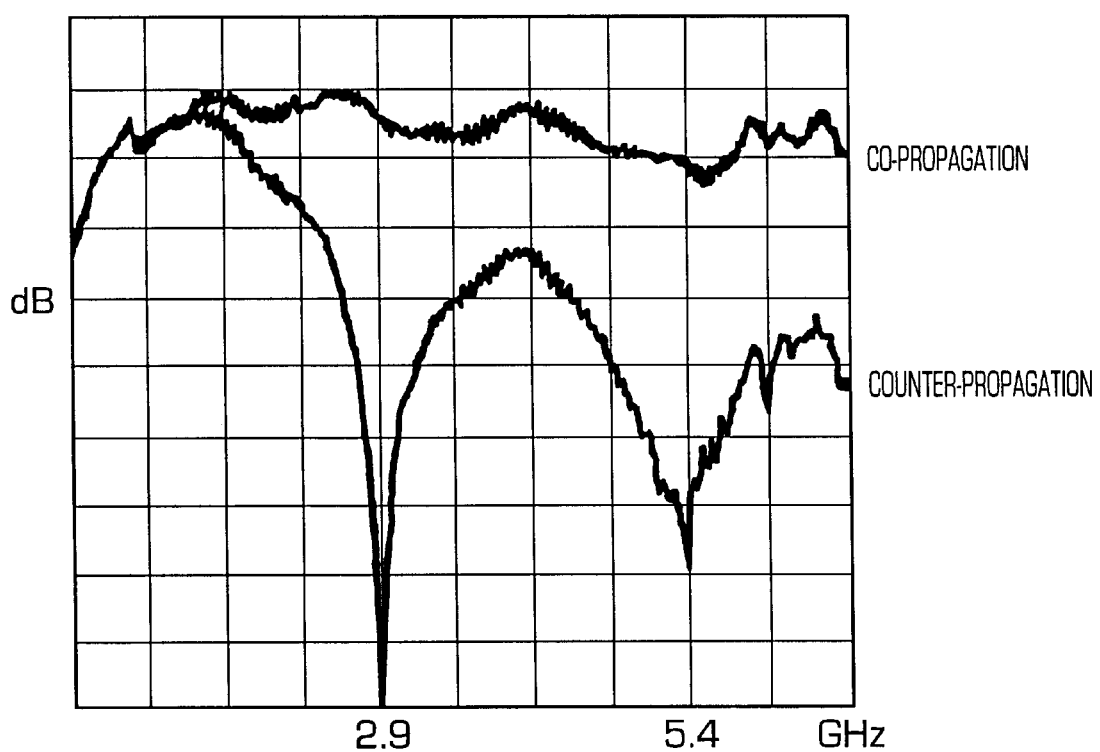
FIG. 3 is a response characteristic curve showing operation of a scrambler such as is employed in FIG. 2.

The response which resulted was nominally flat over the frequency span tested (as expected) as illustrated in FIG. 3. Now the optical signal's direction was reversed through the device and the measurement repeated. This time a trace with resonant dips was seen at characteristic frequencies (2.9 GHz and 5.4 GHz). In other words, at some frequencies the modulator works as normal, and at others operation effectively ceases. The position of the peaks is related to the electrode geometry and the standing waves that are set up (this could possibly be tailored by design).

This test confirms that if modulating frequencies are chosen carefully in the design then one signal will only affect the co-propagating wave and not the counter. So the design mimics two completely separate modulators. For this particular device (if it was a pure Phase modulator), frequencies chosen would be 2.9 and 5.4 GHz. Alternatively two frequencies of for example 2.8 and 3.0 GHz could be used developing a so called "low-speed" scrambler.

Figure 4:
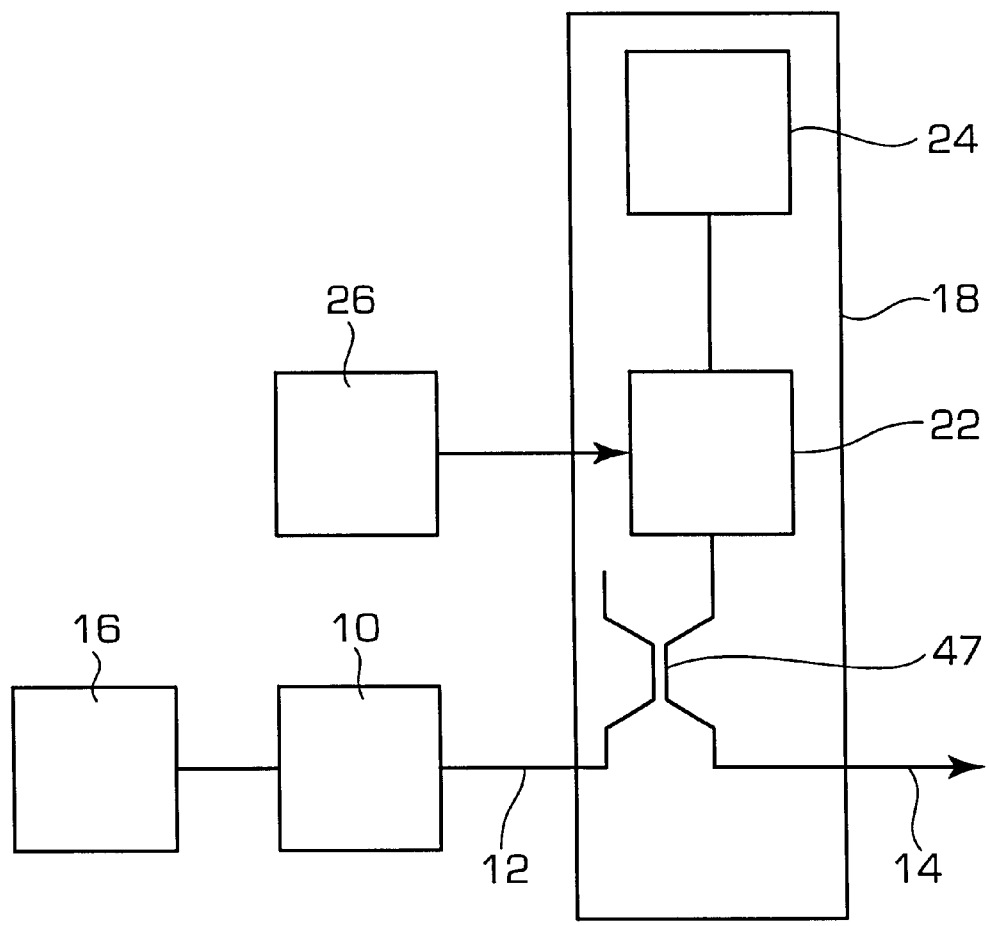
FIG. 4 is a schematic block diagram similar to FIG. 1 employing a 3 dB optical coupler, and, FIG. 5 is a schematic block diagram showing multiple optical signal generators employing a single optical signal scrambler constructed in accordance with the invention.

Although the embodiments described in connection with FIGS. 1 and 2 employ an optical circulator 20 to provide routing of the transmission signal into and out from the modulator it will be appreciated that alternative coupling means may be employed for example a 3 dB coupler 47 as is shown in FIG. 4. In this arrangement the signal coming from the laser 10 over the fibre 12 is split by the 3 dB coupler 47 so that half is transmitted via the modulator 22 to the Faraday mirror 24 where the polarisation orientation is rotated by 45° and then reflected for a second pass through the modulator 22. After passing through the modulator the light has a varying polarisation state and again splits so that half is transmitted to the fibre 14. Accordingly the light output on the fibre 14 has 6 dB of loss as compared with the light entering from fibre 12. This arrangement can be employed with the single modulating drive of FIG. 1 or the two modulating drivers of FIG. 2. Whilst this arrangement is less efficient it is cheaper to manufacture and may be preferred for some applications.

Figure 5:
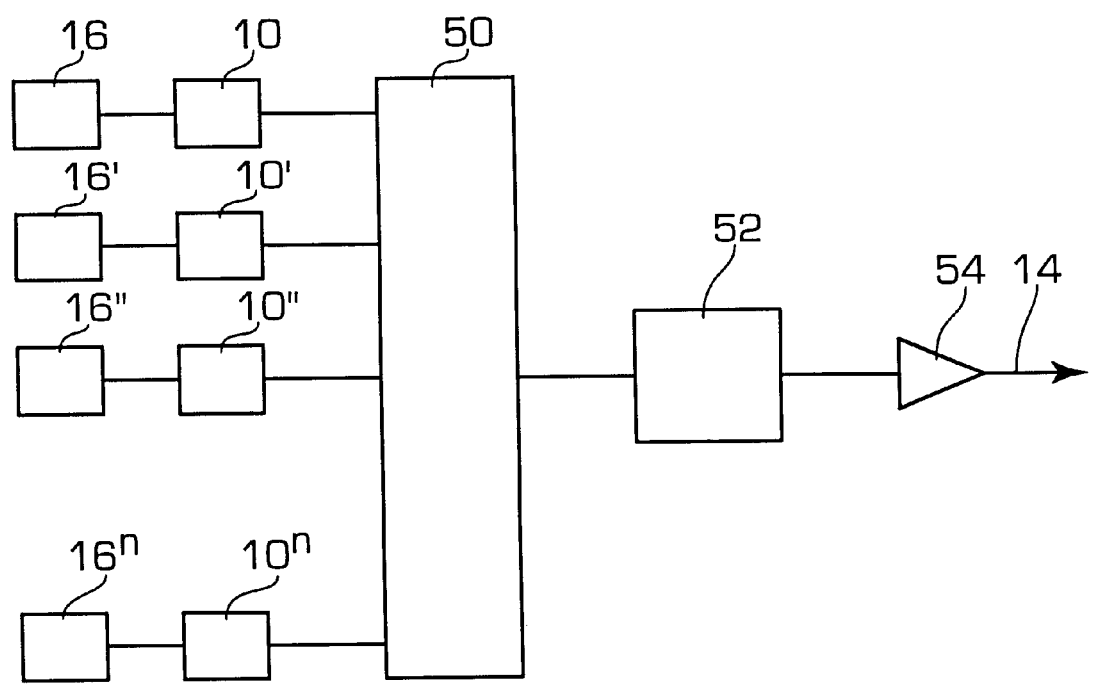

FIG. 5 shows an optical signal generator employing a multiplicity of signal sources each employing a laser 10, 10'–10" providing a different wavelength e.g. between 1530 and 1560 μm each having an associated transmission signal generator 16, 16'–16" coupled by non Polarisation maintaining optical fibre to a multiplexer 50 to a scrambler 52 which may be either of the scramblers 18 or 40 of FIGS. 1 and 2 respectively. The output of the scrambler is fed via an optical amplifier 54 to the optical fibre line. In this way a single scrambler can be used to scramble the polarisation of a multiplicity of information carrying transmission wavelengths prior to launch onto the optical fibre line.

Although the embodiments described employ a lithium niobate modulator any modulator which exhibits an electro optical effect can be employed e.g. gallium arsenide device.

We claim:

1. An optical signal scrambler comprising an optical phase modulator having a common input/output for an optical signal, an input for a modulating signal, and a common output/input coupled to a 45° Faraday mirror whereby, an optical signal input to the input/output of the modulator is returned as an output which is phase scrambled.

2. A scrambler as claimed in claim 1, comprising coupling means for routing the optical signal to the input/output of the modulator and for coupling the returned signal to an optical transmission line.

3. A scrambler as claimed in claim 2, wherein the coupling means comprises a three port circulator having a first port for receiving the optical signal a second port coupled to the common input/output of the modulator and a third port for connection the optical transmission line.

4. A scrambler as claimed in claim 2, wherein the coupling means comprises a 3 dB coupler.

5. A scrambler as claimed in claim 1, comprising a modulating signal generator coupled to the modulating input.

6. A scrambler as claimed in claim 1 comprising two modulating signal generators of different wavelength coupled to the modulating input.

7. A scrambler as claimed in claim 6, wherein the modulator is arranged to be a travelling wave configuration with a modulating electrode having an input at each end, each of which ends is coupled to a different one of the modulating signal generators thereby to modulate the signal each in a different direction of passage through the modulator.

8. A scrambler as claimed in claim 1 wherein the modulator is a lithium Niobate phase modulator.

9. An optical signal generator comprising a scrambler as claimed in claim 1 coupled to a laser signal generator source.

10. An optical signal generator comprising a scrambler as claimed in claim 1 and a plurality of laser signal generators each of a different wavelength coupled via a multiplexer to the scrambler.

11. A method of phase scrambling of an optical signal including the steps of passing the signal in one direction through an optical phase modulator, modulating the phase of the signal during passage through the modulator to a Faraday reflector, reflecting the modulated signal back through the modulator for further phase modulation thereby to scramble the signal irrespective of its original polarisation.

* * * * *